US012126984B2

(12) United States Patent
Desloge

(10) Patent No.: US 12,126,984 B2
(45) Date of Patent: Oct. 22, 2024

(54) THREE-DIMENSIONAL AUDIO SOURCE SPATIALIZATION

(71) Applicant: Google LLC, Mountain View, CA (US)

(72) Inventor: Joseph Desloge, Mountain View, CA (US)

(73) Assignee: Google LLC, Mountain View, CA (US)

( * ) Notice: Subject to any disclaimer, the term of this patent is extended or adjusted under 35 U.S.C. 154(b) by 296 days.

(21) Appl. No.: 17/594,196

(22) PCT Filed: Jun. 12, 2019

(86) PCT No.: PCT/US2019/036801

§ 371 (c)(1),
(2) Date: Oct. 6, 2021

(87) PCT Pub. No.: WO2020/251569

PCT Pub. Date: Dec. 17, 2020

(65) Prior Publication Data

US 2022/0167111 A1 May 26, 2022

(51) Int. Cl.
*H04S 7/00* (2006.01)

(52) U.S. Cl.
CPC ........... *H04S 7/303* (2013.01); *H04S 2400/11* (2013.01); *H04S 2420/01* (2013.01)

(58) Field of Classification Search
CPC ... H04S 7/303; H04S 2400/11; H04S 2420/01
See application file for complete search history.

(56) References Cited

U.S. PATENT DOCUMENTS

| | | | | |
|---|---|---|---|---|
| 6,243,476 | B1 | 6/2001 | Gardner | |
| 2016/0080886 | A1 | 3/2016 | De Bruijn et al. | |
| 2017/0280264 | A1 * | 9/2017 | Wang | H04S 7/30 |

FOREIGN PATENT DOCUMENTS

| | | | |
|---|---|---|---|
| CN | 102860041 | A | 1/2013 |
| CN | 108476366 | A | 8/2018 |

OTHER PUBLICATIONS

International Search Report and Written Opinion for PCT Application No. PCT/US2019/036801, mailed on Jun. 24, 2020, 19 pages.
Invitation to Pay Additional Fees for PCT Application No. PCT/US2019/036801, mailed on Feb. 18, 2020, 17 pages.
Mehrotra, et al., "Realistic Audio in Immersive Video Conferencing"; Microsoft Research, 2011 IEEE, 4 pages.

(Continued)

*Primary Examiner* — Ping Lee
(74) *Attorney, Agent, or Firm* — Brake Hughes Bellermann LLP

(57) ABSTRACT

Techniques of delivering audio in a telepresence system include specifying a frequency threshold below which crosstalk cancellation (CC) is used and above which VBAP is used. In some implementations, such a frequency threshold is between 1000 Hz and 2000 Hz. Moreover, in some implementations, the improved techniques include modifying VBAP for more than three loudspeakers by forming an over-determined system to determine the amplitude weights for all loudspeakers at once.

19 Claims, 7 Drawing Sheets

(56) References Cited

OTHER PUBLICATIONS

Hamdan, et al., "Low Frequency Crosstalk Cancellation and Its Relationship to Amplitude Panning", Institute of Sound and Vibration Research, University of Southampton, United Kingdom, ICASSP 2019, 5 pages.
First Office Action for Chinese Application No. 201980095340.8 (with English translation), mailed on Jan. 23, 2024, 15 pages.
Communication pursuant to Rule 164(2)(b) and Article 94(3) EPC for European Application No. 19737316.0, mailed May 16, 2024, 15 pages.
Jeon, et al., "Virtual Source Planning Using Multiple-Wise Vector Base in the Multispeaker Stereo Format", 18th European Signal Processing Conference, XP032757371, Aug. 29-Sep. 2, 2011, pp. 1337-1341.
Pulkki, "Virtual Sound Source Positioning Using Vector Base Amplitude Panning", Journal of the Audio Engineering Society, vol. 45, No. 6, XP055303802, Jun. 1997, pp. 456-466.

* cited by examiner

THREE-DIMENSIONAL AUDIO SOURCE SPATIALIZATION

CROSS-REFERENCE TO RELATED APPLICATION

This application is a 35 U.S.C. § 371 National Phase Entry Application from PCT/US2019/036801, filed on Jun. 12, 2019, entitled "THREE-DIMENSIONAL AUDIO SOURCE SPATIALIZATION", the disclosure of which is incorporated herein by reference in its entirety.

TECHNICAL FIELD

This description relates to three-dimensional audio source spatialization in systems such as telepresence systems.

BACKGROUND

Telepresence refers to a set of technologies that allow a person to feel as if they were present or to give the appearance of being present at a place other than their true location. For example, rather than traveling great distances to have a face-face meeting, one may instead use a telepresence system, which uses a multiple codec video system, to provide the appearance of being in a face-to-face meeting. Each member of the meeting uses a telepresence room to "dial in" and can see and talk to every other member on a screen as if they were in the same room. Such a telepresence system may represent an improvement over conventional phone conferencing and video conferencing as the visual aspect greatly enhances communications, allowing for perceptions of facial expressions and other body language.

SUMMARY

In one general aspect, a method can include receiving, by processing circuitry configured to perform audio source spatialization, audio data from an audio source at a source position, the audio data representing an audio waveform configured to be converted to sound at a frequency via a plurality of loudspeakers heard by a listener at a listener position, each of the plurality of loudspeakers having a respective loudspeaker position. The method can also include, in response to the frequency of the audio signal being below a specified threshold, performing, by the processing circuitry, a crosstalk cancelation (CC) operation on the plurality of loudspeakers to produce an amplitude and phase of a respective audio signal emitted by that loudspeaker to determine spatialization cues. The method can further include, in response to the frequency of the audio signal being above the specified threshold, performing, by the processing circuitry, a vector-based amplitude panning (VBAP) operation on the plurality of loudspeakers to produce a respective weight for that loudspeaker, the respective weight for each of the plurality of loudspeakers representing a factor by which an audio signal emitted by that loudspeaker is multiplied to determine spatialization cues. In some implementations, the weight is complex and includes a phase.

In another general aspect, computer program product comprising a nontransitory storage medium, the computer program product including code that, when executed by processing circuitry configured to perform audio source spatialization, causes the processing circuitry to perform a method. The method can include receiving audio data from an audio source at a source position, the audio data representing an audio waveform configured to be converted to sound at a frequency via a plurality of loudspeakers heard by a listener at a listener position, each of the plurality of loudspeakers having a respective loudspeaker position. The method can also include generating a loudspeaker matrix having elements that are components of a vector parallel to a difference between the listener position and the respective loudspeaker position of each of the plurality of loudspeakers. The method can further include generating a source vector having elements that are components of a vector parallel to a difference between the listener position and the source position. The method can further include performing a pseudoinverse operation on the loudspeaker matrix and the source vector to produce a weight vector having components, each component of the weight vector representing a respective weight for each of the plurality of loudspeakers.

The details of one or more implementations are set forth in the accompanying drawings and the description below. Other features will be apparent from the description and drawings, and from the claims.

DETAILED DESCRIPTION

Figure 1:
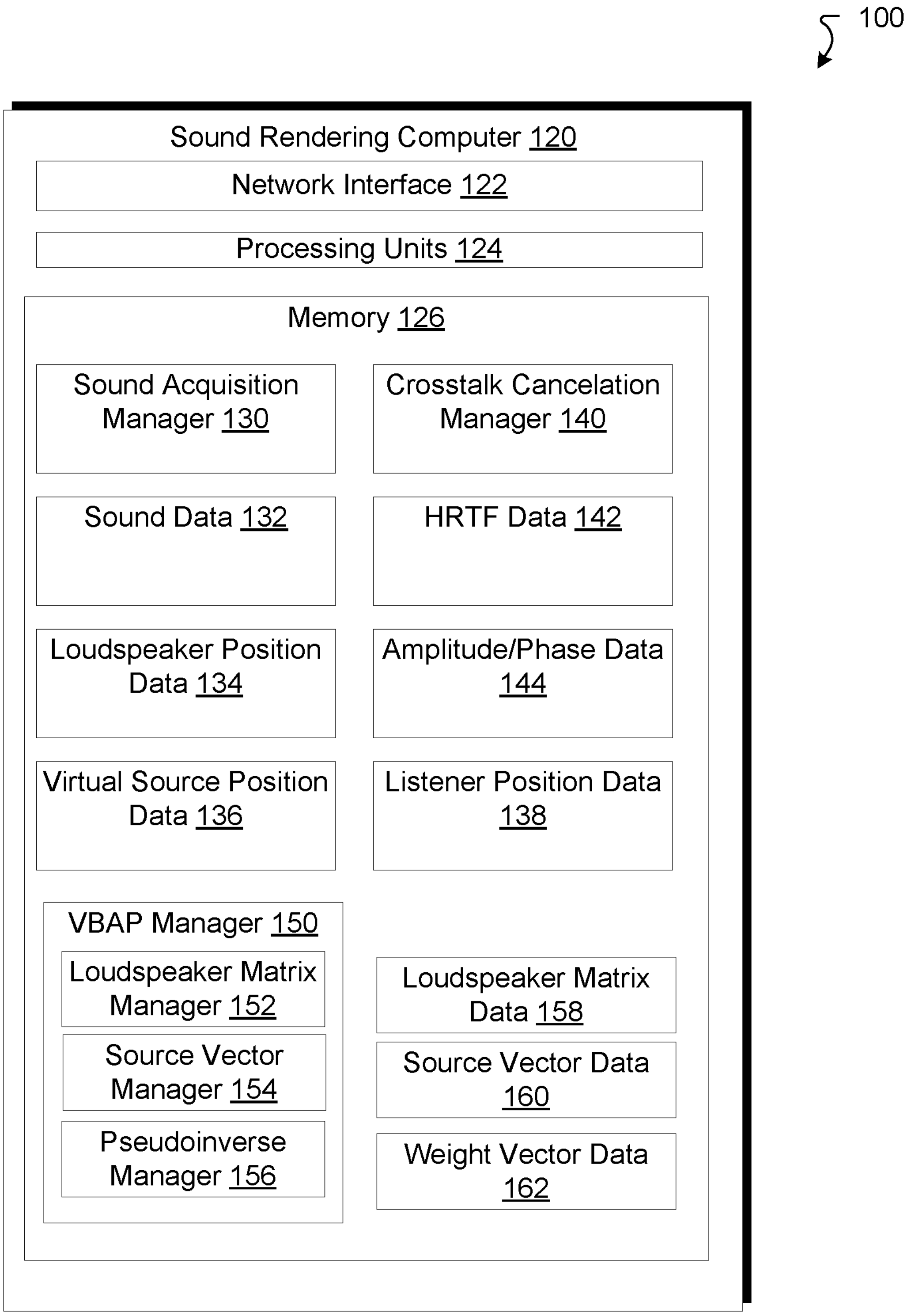
FIG. 1 is a diagram that illustrates an example electronic environment for implementing improved techniques described herein.

A goal of a telepresence system that delivers the above-described audio is to provide an appropriately-spatialized talker voice to the listener. Such a system accurately delivers sound to the listener's left and right ears. The delivery would be simple if the use of headphones were permitted. Nevertheless, in the telepresence examples of interest, the listening experience is unencumbered and, accordingly, loudspeaker presentation is used.

There are multiple techniques for delivering spatialized audio to a listener—including Wavefield Synthesis and also ambisonics. These techniques are generally used for the presentation of complex acoustic environments (with many sound sources) and require a minimum of four (for B-format ambisonics installations) and often many more (for high-order ambisonics and wavefield synthesis installations) loudspeakers. Moreover, loudspeakers for ambisonics envelope/surround a listener.

In contrast, the above-described telepresence system uses a comparatively small number of loudspeakers (e.g., between two and four). In some implementations, these speakers are positioned in front of the listener. Accordingly, neither ambisonics nor wavefield synthesis are practical for use in the above-described telepresence system. Rather, a loudspeaker display is centered instead around two, conceptually-simple techniques intended for using two or more loudspeakers to display spatialized sound to a single listener: Crosstalk Cancellation and Vector-Based Amplitude Panning.

One conventional approach to delivering audio in a telepresence system includes using a crosstalk cancellation technique to determine complex signals from each loudspeaker that produces desired signals in each of the listener's ears. Another conventional approach to delivering audio in a telepresence system includes using vector-based amplitude panning (VBAP) to derive amplitude weighting for each loudspeaker that properly localizes the audio source.

The above-described conventional approaches to delivering audio in a telepresence system have some deficiencies that may lead to poor spatialization. For example, while crosstalk cancellation can provide more accurate spatialization cues, crosstalk cancellation also tends to be sensitive to tracker errors at high frequencies where the sound wavelength is close to the magnitude of a tracker error. VBAP is less sensitive to tracker errors but yields less accurate spatialization cues.

Further, VBAP assumes that there are exactly three loudspeakers and that the listener's head is equidistant from each of the loudspeakers. If there are more than three loudspeakers, then the area defined by the loudspeakers is decomposed into non-intersecting triangles with loudspeakers at the vertices, and VBAP is carried out for each triplet of triangles. This can be problematic because there may be more than one way to decompose the area and no clear way to determine which way is preferable.

In accordance with the implementations described herein and in contrast with the above-described conventional approaches to delivering audio in a telepresence system, improved techniques of delivering audio in a telepresence system include specifying a frequency threshold below which crosstalk cancellation (CC) is used and above which VBAP is used. In some implementations, such a frequency threshold is between 1000 Hz and 2000 Hz. Moreover, in some implementations, the improved techniques include modifying VBAP for more than three loudspeakers by forming an over-determined system to determine the amplitude weights for all loudspeakers at once.

Such a hybrid scheme maintains the more accurate CC localization cues in the frequency region where they are most important and where CC sensitivity to tracker error and head-related transfer function (HRTF) individualization are lowest, while the less accurate and less-sensitive VBAP localization cues are used outside the frequency region. Further, the modified VBAP does not assume that the listener is equidistant from all loudspeakers, and the weights determined by the modified VBAP for each loudspeaker do not depend on an arbitrary decomposition of the area spanned by those loudspeakers.

FIG. 1 is a diagram that illustrates an example electronic environment 100 in which the above-described improved techniques may be implemented. As shown, in FIG. 1, the example electronic environment 100 includes a sound rendering computer 120.

The sound rendering computer 120 is configured to implement the above-described hybrid scheme and perform the above-described modified VBAP operations. The sound rendering computer 120 includes a network interface 122, one or more processing units 124, and memory 126. The network interface 122 includes, for example, Ethernet adaptors, Token Ring adaptors, and the like, for converting electronic and/or optical signals to electronic form for use by the sound rendering computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the sound rendering computer 120 can be, or can include processors (e.g., processing units 124) configured to process instructions stored in the memory 126. Examples of such instructions as depicted in FIG. 1 include a sound acquisition manager 130, a crosstalk cancelation manager 140, and a VBAP manager 150. Further, as illustrated in FIG. 1, the memory 126 is configured to store various data, which is described with respect to the respective managers that use such data.

The sound acquisition manager 130 is configured to acquire sound data 132 from a sound source. For example, in a telepresence system hosting a virtual meeting, a meeting participant at a remote location speaks, and the sound produced by the speech is detected by a microphone. The microphone converts the detected sound into a digital data format that is transmitted to the sound rendering computer 120 over a network.

The sound data 132 represent the audio detected by the microphones and converted into a digital data format. In some implementations, the digital data format is uncompressed, mono, at 16 kHz and 16-bit resolution. In some implementations, the digital data format is in a compressed, stereo format such as Opus or MP3. In some implementations, the recording is performed at a rate higher than 16 kHz, e.g., 44 kHz or 48 kHz. In some implementations, the resolution is higher than 16 bit, e.g., 24 bit, 32-bit, float, etc. The sound rendering computer 120 is then configured to convert the sound data 132 to sound that is played over the loudspeakers such that, at the listener's position, the listener will perceive the sound as originating from a virtual source position (e.g., at a seat next to the listener).

The sound data 132 represent the audio produced by a source at any instant in time using a waveform. The waveform represents a range of frequencies at each time instant, or over a time window. In some implementations, the sound acquisition manager 130 is configured to store a frequency-space representation of the sound data 132 over a specified time window (e.g., 10 secs, 1 secs, 0.5 secs, 0.1 secs, or so on). In this case, for each time window, there is a distribution of frequencies and corresponding amplitudes and phases.

The loudspeaker position data 134 represent positions of the loudspeakers in a neighborhood of the listener. The positions are specified with regard to an origin of a specified coordinate system. In some implementations, the origin of the coordinate system is at a point in the listener's head. In some implementations, the loudspeaker position data are represented by a Cartesian coordinate triplet.

The virtual source position data 136 represent a position of a virtual source within the above-described coordinate system. The position of the virtual source is the apparent position of the source of the sound as heard by the listener. For example, in a telepresence system, it may be desired to conduct a meeting with a remote user, but as if that remote user were sitting next to the listener. In this case, the position of the virtual source would be in that place, next to the listener.

The listener position data 138 represent a position of the listener within the above-described coordinate system. In some implementations, the position of the listener is at the origin of the coordinate system. In some implementations, the listener position data 138 changes with time, corresponding to a tracking of the motion of the listener.

The crosstalk cancelation manager 140 is configured to perform a crosstalk cancelation operation on the sound data 132 and HRTF data 142 to produce amplitude/phase data 144. As is discussed in detail with regard to FIGS. 3 and 4, a crosstalk cancelation operation generates an amplitude/phase signal at each loudspeaker based on the sound data 132 and the HRTF data 142. The operation is carried out by the sound rendering computer 120 when the frequency is below a specified threshold, e.g. 1000 Hz, 2000 Hz, or in between.

The HRTF data 142 represent the various HRTFs between each speaker and each ear of the listener. With two loudspeakers and two ears, there are four HRTFs used for each configuration of users and loudspeakers. In some implementations, the HRTFs are based on a rigid-sphere model, i.e., a parametric model that depends on the position and orientation of the listener with respect to the loudspeakers. The HRTFs, like the sound data, are represented in frequency space.

The amplitude/phase data 144 represent the output of the crosstalk cancelation operation, namely a respective amplitude and phase that is emitted at each loudspeaker so that the listener hears, in each ear, a respective, desired sound. In some implementations, because the sound data 132 is sampled in frequency space over time windows, the amplitude/phase data 144 will change with each time window duration.

The VBAP manager 150 is configured to perform a VBAP operation on the loudspeaker position data 134, virtual source position data 136, and listener position data 138 to produce weight vector data 162 representing amplitude weights for each loudspeaker. As shown in FIG. 1, the VBAP manager 150 includes a loudspeaker matrix manager 152, a source vector manager 154, and a pseudoinverse manager 156.

The loudspeaker matrix manager 152 is configured to generate loudspeaker matrix data 158 based on the loudspeaker position data 134 and the listener position data 138. In some implementations, the loudspeaker matrix data 158 has columns including components of unit vectors in the directions of the loudspeaker positions relative to the listener position.

The source vector manager 154 is configured to generate source vector data 160 based on the virtual source position data 136 and the listener position data 138. In some implementations, the source vector data 160 has elements including components of a unit vector in the direction of the virtual source position relative to the listener position.

The pseudoinverse manager 156 is configured to perform a pseudoinverse operation on the loudspeaker matrix data 158 and the source vector data 160 to produce the weight vector data 162. In some implementations, the pseudoinverse operation includes generating a Penrose pseudoinverse from the loudspeaker matrix data 158. In some implementations, the pseudoinverse operation includes generating a singular value decomposition (SVD) of the loudspeaker matrix represented by the loudspeaker matrix data 158.

The weight vector data 162 represents a weight vector with elements being a respective weight for each of the loudspeakers. The weight for a loudspeaker represents a factor by which a signal emitted by that loudspeaker is multiplied so that the listener hears a desired sound. In some implementations, each element of the weight vector is a positive number. In some implementations, at least one of the elements of the weight vector is zero, implying that the loudspeaker to which that zero weight corresponds plays no role in producing the desired sound for the listener.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the sound rendering computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the sound rendering computer 120.

The components (e.g., modules, processing units 124) of the sound rendering computer 120 can be configured to operate based on one or more platforms (e.g., one or more similar or different platforms) that can include one or more types of hardware, software, firmware, operating systems, runtime libraries, and/or so forth. In some implementations, the components of the sound rendering computer 120 can be configured to operate within a cluster of devices (e.g., a server farm). In such an implementation, the functionality and processing of the components of the sound rendering computer 120 can be distributed to several devices of the cluster of devices.

The components of the sound rendering computer 120 can be, or can include, any type of hardware and/or software configured to process attributes. In some implementations, one or more portions of the components shown in the components of the sound rendering computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the sound rendering computer 120 can be, or can include, a software module configured for execution by at least one processor (not shown). In some implementations, the functionality of the components can be included in different modules and/or different components than those shown in FIG. 1.

Although not shown, in some implementations, the components of the sound rendering computer 120 (or portions thereof) can be configured to operate within, for example, a data center (e.g., a cloud computing environment), a computer system, one or more server/host devices, and/or so forth. In some implementations, the components of the sound rendering computer 120 (or portions thereof) can be configured to operate within a network. Thus, the components of the sound rendering computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the sound rendering computer 120 can be, or can include, processors configured to process instructions stored in a memory. For example, the sound acquisition manager 130 (and/or a portion thereof), the crosstalk cancelation manager 140 (and/or a portion thereof), and the VBAP manager 150 (and/or a portion thereof) can be a combination of a processor and a memory configured to execute instructions related to a process to implement one or more functions.

Figure 2:
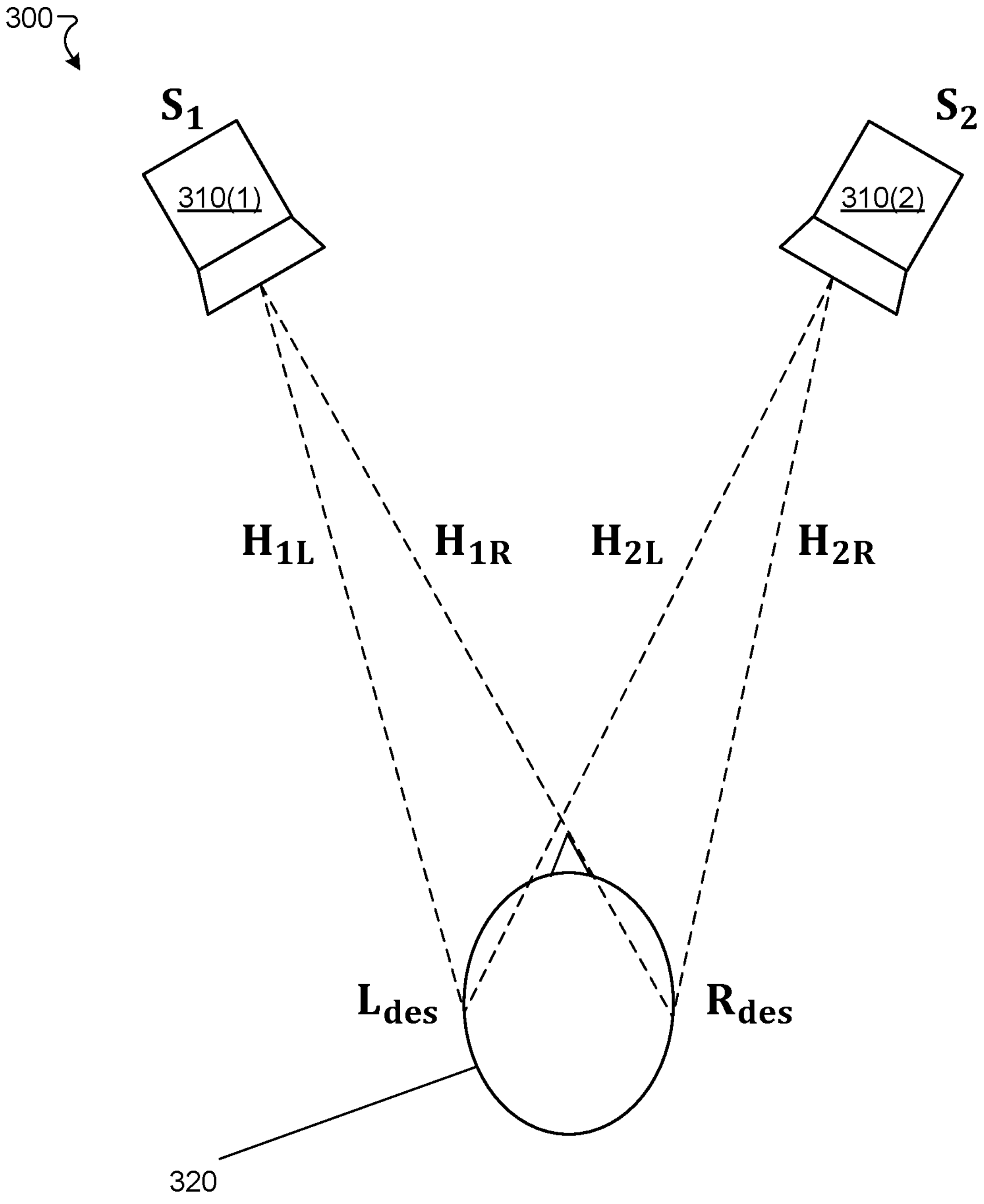
FIG. 2 is a flow chart that illustrates an example method of performing the improved techniques within the electronic environment.

FIG. 2 is a flow chart that illustrates an example method 200 of mapping user interaction data to discrete buckets. The method 200 may be performed by software constructs described in connection with FIG. 1, which reside in memory 126 of the sound rendering computer 120 and are run by the set of processing units 124.

At 202, the sound acquisition manager 130 receives audio data from an audio source at a source position, the audio data representing an audio waveform configured to be converted to sound at a frequency via a plurality of loudspeakers heard by a listener at a listener position, each of the plurality of loudspeakers having a respective loudspeaker position.

At 204, the crosstalk cancelation manager 140 performs a crosstalk cancelation (CC) operation on the plurality of loudspeakers in response to the frequency of the audio signal being below a specified threshold to produce an amplitude and phase of a respective audio signal emitted by that loudspeaker to determine spatialization cues.

At 206, the VBAP manager 150 performs a VBAP operation on the plurality of loudspeakers in response to the frequency of the audio signal being above the specified threshold to produce a respective weight for that loudspeaker, the respective weight for each of the plurality of loudspeakers representing a factor by which an audio signal emitted by that loudspeaker is multiplied to determine spatialization cues.

Figure 3:
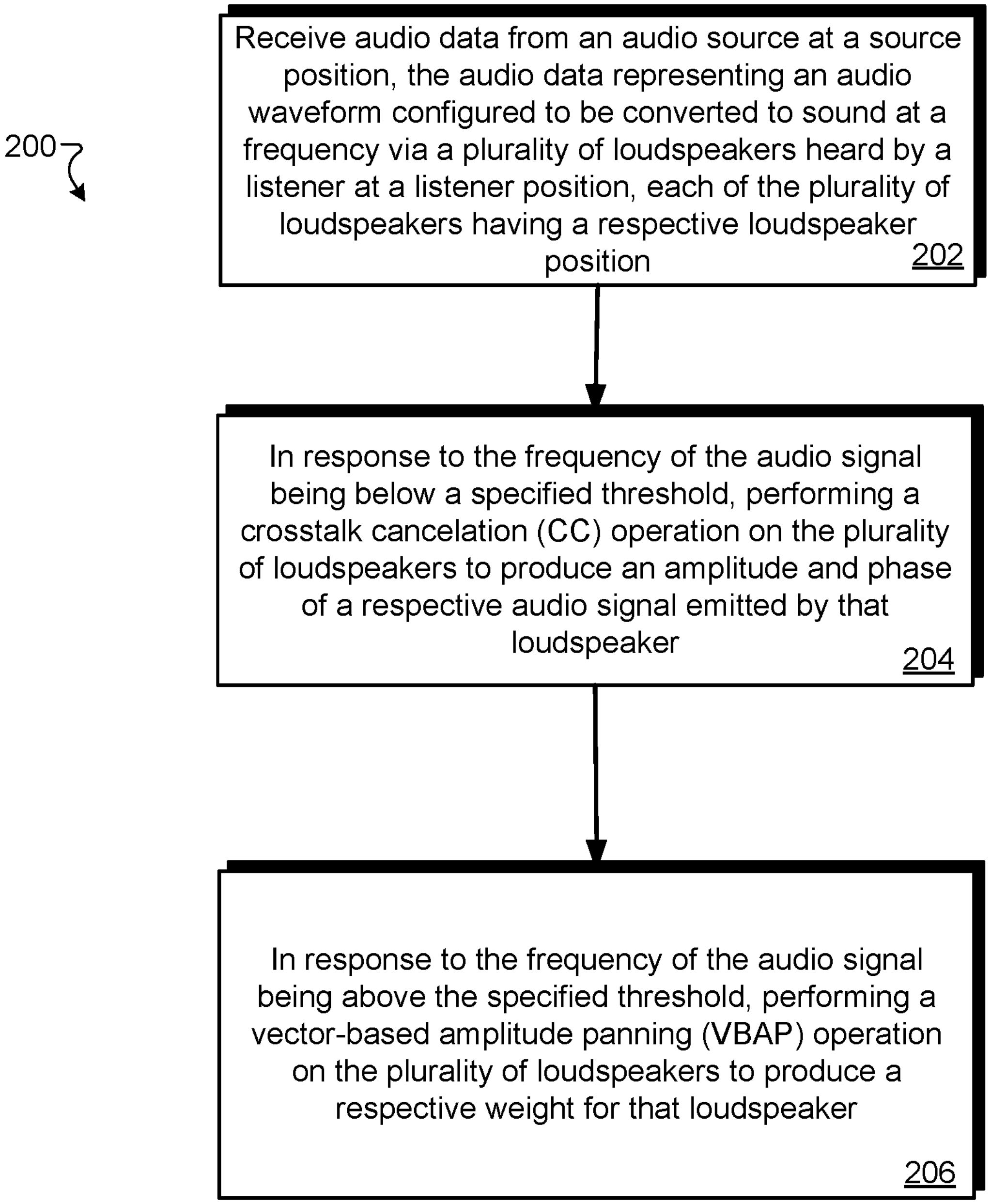
FIG. 3 is a diagram that illustrates an example geometry used in considering a crosstalk cancelation (CC) operation.

FIG. 3 is a diagram that illustrates an example geometry 300 used in considering a crosstalk cancelation (CC) operation. Within the geometry 300, a pair of loudspeakers 310(1) and 310(2) face a listener 320.

Propagation of sound from a source to a human listener is generally described in terms of a head-related transfer function (HRTF). The HRTF is the frequency response describing propagation from a point source at a specific location to the left and right ears in the absence of reverberation. The HRTF depends upon many factors. For simplicity, it is generally reduced to a dependence on the source orientation of arrival—i.e., azimuth and elevation—relative to the direction in which the head is pointing. Other factors, such as distance, head rotation relative to the torso, etc. are generally ignored.

Sound presented by loudspeaker 310(1) propagates to the ears of the listener 320 using the HRTF described by ($H_{1L}$, $H_{1R}$). Similarly, sound presented by loudspeaker 310(2) propagates to the ears of the listener 320 as described by ($H_{2L}$, $H_{2R}$). This means that—represented in the frequency domain—signals $S_1$ and $S_2$ played from the loudspeakers yield an observe signals L and R that obey the following relation:

$$\begin{pmatrix} H_{1L} & H_{2L} \\ H_{1R} & H_{2R} \end{pmatrix}\begin{pmatrix} S_1 \\ S_2 \end{pmatrix} = \begin{pmatrix} L \\ R \end{pmatrix}.$$

Assuming that the desired binaural signals to be presented at the two ears is given by $L_{des}$ and $R_{des}$, then this system of equations can be solved for the appropriate $S_1$ and $S_2$ that, when played over the loudspeakers, will yield the desired signal at the ears:

$$\begin{pmatrix} S_1 \\ S_2 \end{pmatrix} = \begin{pmatrix} H_{1L} & H_{2L} \\ H_{1R} & H_{2R} \end{pmatrix}^{-1}\begin{pmatrix} L_{des} \\ R_{des} \end{pmatrix} = \frac{1}{H_{1L}H_{2R} - H_{1R}H_{2L}}\begin{pmatrix} H_{2R} & -H_{2L} \\ -H_{1R} & H_{1L} \end{pmatrix}\begin{pmatrix} L_{des} \\ R_{des} \end{pmatrix}.$$

Thus, if the speaker-to-ear HRTFs ($H_{1L}$, $H_{1R}$) and ($H_{2L}$, $H_{2R}$) are known, one may generate the loudspeaker output signals necessary to deliver the spatialized audio to the listener 320.

It is noted that when the position of the listener changes with respect to the loudspeakers (or vice-versa), the HRTFs will change. An example of a HRTF that may be changed in real time as the listener moves are provided in FIG. 4.

Figure 4:
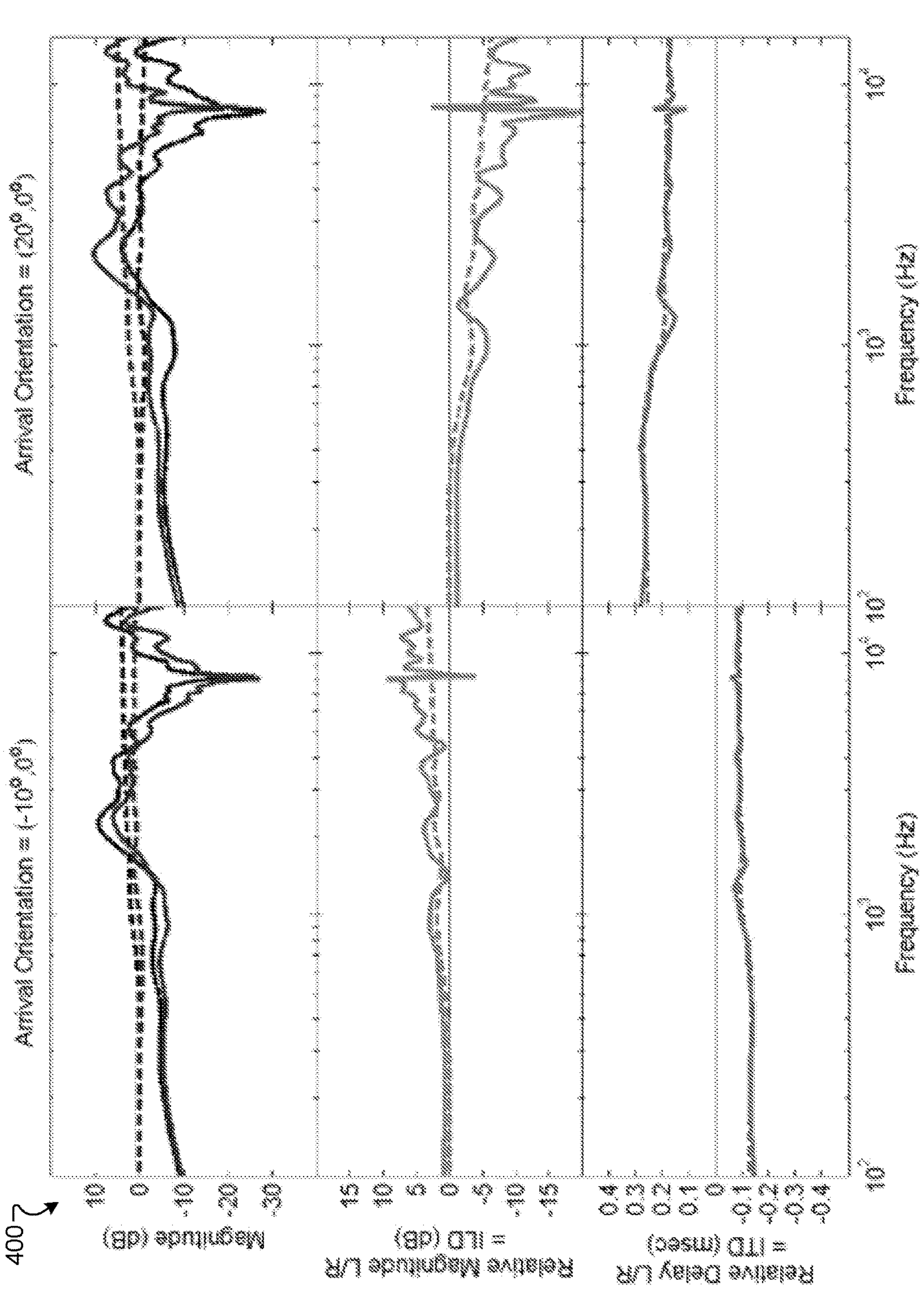
FIG. 4 is a diagram that illustrates an example rigid-sphere HRTF model at two different arrival orientations.

FIG. 4 shows the HRTF for two source orientations (az, el): (−10°,0°) and (20°,0°) located on the left and right sides, respectively, of the listener's head. The top row of panels shows the magnitudes of the left and right ear transfer functions. The middle row of panels shows the magnitude of the left-ear divided by the right-ear frequency response. The bottom row shows the temporal propagation relative left-versus-right-ear temporal delay. These plots show the following HRTF features that are relevant for sound localization.

Interaural Time Difference (ITD) which is the relative delay evident in the source signal between the two ears. Consider the bottom row of panels in FIG. 4. The source arriving from the listener's left—i.e., from (−10°,0°)—arrives at the left ear first and the right ear second. This yields the negative Relative Delay L/R (=ITD) observed for this source location. The source arriving from the listener's right—i.e., from (20°,0°)—exhibits the opposite behavior. The |ITD| for the more laterally-located source from (20°, 0°) is greater than that of the source from (−10°,0°). ITD is not constant with frequency as it would be for points in the free-field. The presence of the head results in ITD magnitudes that are greater at lower frequencies than higher frequencies.

Interaural Level Difference (ILD) which is the relative level difference in the source signal between the two ears. Consider the top and middle rows of panels in FIG. 4. The source arriving from the listener's left—i.e., from (−10°, 0°)—is louder at the left ear than at the right ear because the head 'shadows' the source as it travels to the right ear. This yields a positive ratio of Magnitude L/R (=ILD) expressed in dB for this source location. The source arriving from the listener's right—i.e., from (20°,0°) —exhibits the opposite behavior. The |ILD| of the more laterally-located source from (20°,0°) is generally greater than that of the source from (−10°,0°) because the degree of head shadowing is higher. Similar to ITD, ILD is not constant with frequency. The presence of the head results in ILD magnitudes that are greater at higher frequencies than lower frequencies.

Spectral Cues which are the peaks, valleys, and notches evident in the transfer function magnitudes shown in the top row of panels in FIG. 4. These arise from a variety of factors including ear canal resonance, reflections from the listener's torso/shoulders, and reflections from the outer ears or pinnae.

In general, the interaural cues (ITD and ILD) reflect source lateralization (i.e., movement to the listener's left or right). The broad trends in ITD and ILD are similar across different listeners and even lend themselves easily to simulation using a rigid sphere head model. ITDs are most relevant to lower frequencies (below ~1500 Hz), since the ITDs begin to alias at higher frequencies. ILDs are most relevant to higher frequencies (above ~1500 Hz), mostly due to the decreased relevance of ITDs at these frequencies.

Interaural cues become ambiguous when considered along 'cones of confusion' of source locations that are similarly lateralized. For example, sources located at (az, el)=(45°,0°), (135°,0°), (90°,45°), and (90°,−45°) are all similarly lateralized along a cone formed by rotating a ray pointing to (45°,0°) about the interaural axis. Spectral cues are generally used by a listener to differentiate between source locations along the same cone of confusion. In particular, spectral cues are useful for elevation localization and front/back source discrimination. They are also useful for 'externalization'—i.e., making the sound appear as if it is originating from an actual point outside of the head. Due to the highly individualized variations in pinna structure across different listeners, spectral cues are highly individualized.

A telepresence system is configured to present the voice of the remote talker as if the talker were in the listener's acoustic space. It is assumed that the sound rendering computer 120 has adequately 'cleaned' the transmitted audio so that it is a single channel consisting solely of the talker's voice. The task of the sound rendering computer 120 is to convert this single source into a binaural signal based upon the relative positions and head orientations of the listener and talker. This is done by applying the appropriate HRTFs to the talker's voice to yield the signals that should be presented to the listener's ear as shown in FIG. 3.

One technique used to acquire these signals is a rigid-sphere model for ILD/ITD rendering, or a rigid-sphere HRTF model. Studies have shown that a rigid sphere model can yield interaural cues and, in particular, ITDs, that reflect those observed with actual listeners. FIG. 4 also shows, in the dashed lines, synthetic HRTFs based on a rigid-sphere head model with a radius of 8.5 cm. (Other radii may be used, e.g., 8.0 cm, 9.0 cm, 7.5 cm, 9.5 cm, and so on.) The interaural cues are very similar, although the high-frequency ILDs tend to be reduced. The detailed spectral cues are absent, but this is not unexpected. Nevertheless, the rigid-sphere model has the advantage of being completely parameterized and mathematically-solvable.

Another technique that may be used is custom HRTF rendering, in which the listener's own empirically-derived HRTF is applied. While this yields the most accurate and realistic binaural signal, in some implementations the cost associated with this approach renders it impractical as a general approach.

Another technique that may be used is reference-set HRTF rendering. Rather than using the individual listener's HRTF, an alternative would be to use a generic, 'typical' HRTF for spatialization, or an HRTF chosen from a library of reference HRTFs. This would yield good spatialization, especially with respect to lateralized sources, since the interaural cues of ITD and ILD are generally similar across listeners.

Another technique that may be used is reference-set ILD/ITD rendering. Instead of using the full HRTF to synthesize spatialization, a simpler alternative would be to synthesize only the interaural (ITD and ILD) localization cues. These cues are similar across listeners, and so the use or a 'reference set' of interaural cues would yield similar spatialization of lateral sources to that achieved using a listener's own interaural cues. Further, the interaural cues are generally less 'rich' than the full HRTF, which means that they may be able to be parameterized or sampled at a less dense set of source orientations, thus reducing the memory footprint at runtime.

As stated above, the above-described CC operation is best performed for lower frequencies (e.g., below between 1000 Hz and 2000 Hz). Above such frequencies, the improved techniques include performing a modified VBAP operation to produce a set of positive weights for at least some of the loudspeakers.

Figure 5:
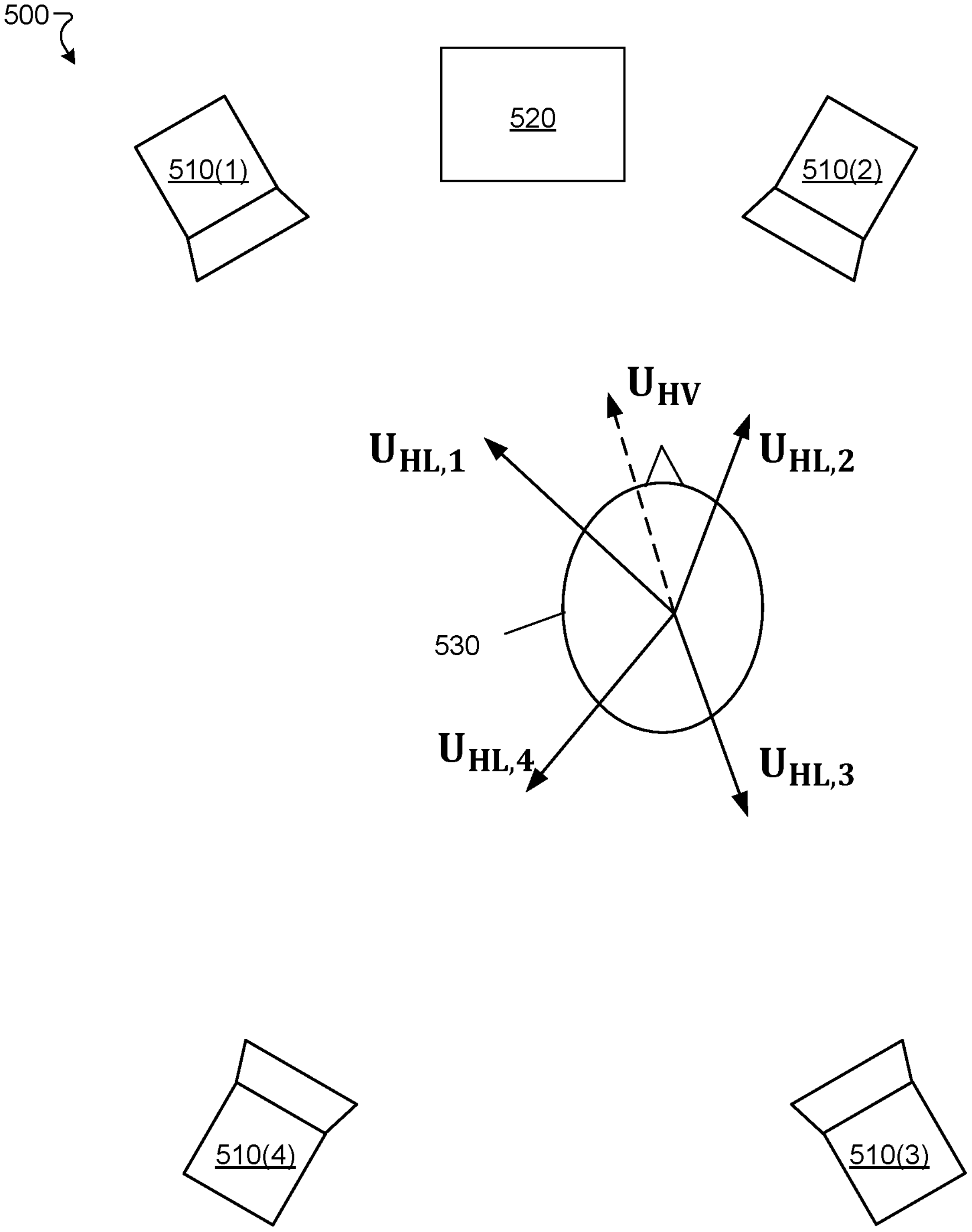
FIG. 5 is a diagram that illustrates an example geometry used in considering a vector-based amplitude panning (VBAP) operation.

FIG. 5 is a diagram that illustrates an example geometry 500 used in considering a modified vector-based amplitude panning (VBAP) operation. In the geometry 500, there are four loudspeakers 510(1), 510(2), 510(3), and 510(4) aimed at a listener 530. There is also a virtual source 520 generally in front of the listener 520. The listener 530 is not necessarily equidistant from all loudspeakers 510(1-4) and may move around with respect to them. In some implementations, there are more than four loudspeakers in the vicinity of the listener 530. In some implementations, there are two loudspeakers in the vicinity of the listener 530.

FIG. 5 shows a set of unit vectors pointing from the center of the listener 530 (or generally, the listener 530) to each of the loudspeakers 510(1-4) $U_{HL,1\text{-}4}$ and the virtual source 520 $U_{HV}$. From these unit vectors, the VBAP manager 150 generates an overdetermined (or underdetermined when the number of loudspeakers is less than three) linear system that produces a weight corresponding to each of the loudspeakers 510(1-4).

The solution of the linear system for conventional VBAP has several limitations. First, conventional VBAP assumes that the head of the listener 530 is positioned equidistant from all loudspeakers, e.g., 510(1-4). Second, conventional VBAP spatializes the virtual source 520 using exactly three loudspeakers. When there are more than three loudspeakers, conventional VBAP requires dividing the listener space into non-overlapping triangles so that each sub-region is covered by exactly three loudspeakers. In conventional VBAP, while spatialization is achieved by calculating VBAP weights for the appropriate subset of loudspeakers, it necessitates an arbitrary division of the space into triangles. For example, when the loudspeakers 510(1-4) are arranged in a square with the listener at the center, the square may be divided into two triangles two different ways: 510(1,2,3)+510(2,3,4), or 510(1,2,4)+510(1,3,4); it is unclear which is preferable. Moreover, the division into groupings of three loudspeakers can lead to counterintuitive loudspeaker weightings. For example, consider the square geometry above divided into two triangular sub-regions spanned by 510(1,2,3)+510(2,3,4). In this case, a virtual source located exactly at the center of the square would have non-zero VBAP weights for loudspeakers 510(2) and 510(3) only. A more intuitive VBAP weighting would have equal contributions from all four loudspeakers. Third, there is no guarantee that all the weights found according to conventional VBAP would all be positive. Accordingly, a modified VBAP is presented with regard to FIG. 6.

Figure 6:
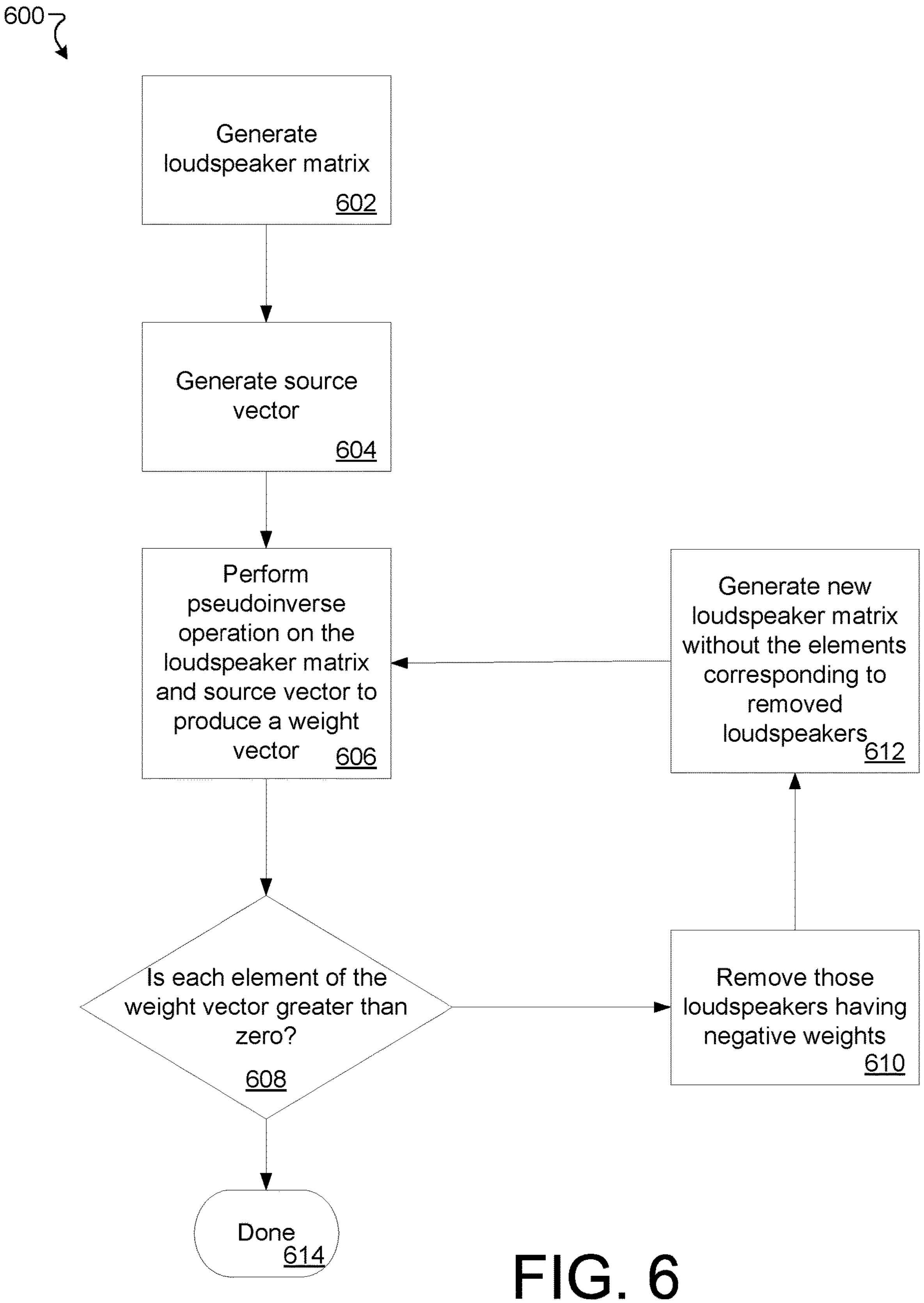
FIG. 6 is a flow chart that illustrates an example process of performing a VBAP operation.

FIG. 6 is a flow chart that illustrates an example method 600 of performing a modified VBAP. The method 600 may be performed by software constructs described in connection with FIG. 1, which reside in memory 126 of the sound rendering computer 120 and are run by the set of processing units 124.

At 602, the loudspeaker manager 152 generates a loudspeaker matrix based on the unit vectors $U_{HL,1\text{-}4}$. Generally, the loudspeaker matrix has a unit vector in three dimensions corresponding to each loudspeaker for each column. For example, when there are N loudspeakers, the loudspeaker matrix has dimensions 3×N. For the case illustrated in FIG. 5, the matrix has dimensions 3×4. Accordingly, the linear system is overdetermined.

At 604, the source vector manager 154 generates a source vector. The source vector in this case is simply the unit vector $U_{HV}$.

At 606, the pseudoinverse manager 156 performs a pseudoinverse operation on the loudspeaker matrix and the source vector to produce a weight vector. For example, in some implementations the pseudoinverse manager 156 generates a Penrose pseudoinverse of a loudspeaker matrix L by computing the matrix $(L^T L)^{-1} L^T$. In this case, the weights are then produced from the quantity $(L^T L)^{-1} L^T U_{HV}$. The weight vector for an overdetermined system is not uniquely determined. In this case, the pseudoinverse manager 156 yields the weight vector w having the minimum norm, i.e., the sum of the squares of the components of the weight vector w is a minimum.

At 608, the VBAP manager 150 determines whether all of the components of the weight vector are positive. If all of the weights are positive, then the method 600 is done 614. If not, then at 610 the VBAP manager sets all of those components of the weight vector w to zero. Effectively, the VBAP manager 150 removes those loudspeakers to which a negative weight corresponds. In this case, at 612, the loudspeaker matrix manager 152 generates a new loudspeaker matrix L' with columns corresponding to the negative weights being removed. The method 600 then repeats until all components of the weight vector w are positive.

In some implementations, the VBAP manager 150, after producing a weight vector with all positive components, multiplies each component by the respective head-to-speaker distance. This multiplication corrects for the inverse-square distance speaker energy loss due to wave propagation over different distances. In the absence of reverberation, this compensates the loudspeaker direct, non-reverberant path signal for situations where the listener is not equidistant from the loudspeakers. In some implementations, the weight vector w may also include a phase component based on the distance between the listener and the loudspeakers. In this case such a phase component aligns the phases of the signals at the listener's head.

The above-described modified VBAP addresses all three concerns outlined above. Specifically, (i) the modified VBAP does not assume that the listener is equidistant from all loudspeakers, (ii) the modified VBAP applies to 2+ loudspeakers, (iii) subsets of loudspeakers are selected by the iterative process rather than by an arbitrary pre-division of the space into triangles, (iv) for arrangements such as a square, a source located at the center of the square received equal VBAP contributions from all four vertex loudspeakers, (v) all weights are positive.

The above-described improved techniques use a tracked listener head position to continually update VBAP weights for the correct source spatialization. It is noted that VBAP depends only upon the listener head position and the virtual source position. VBAP does not require knowledge of either head rotation or HRTF. This can lead to spatialization cues that are less accurate than those provided by CC, but the spatialization cues are also less susceptible to tracking errors and HRTF imprecision.

To summarize, CC requires knowledge of listener position/rotation as well as listener HRTF. VBAP, on the other hand, requires knowledge of listener position only. Generally, CC provides more accurate localization cues, but is more sensitive to tracker (especially rotation) errors and is limited by the accuracy of the underlying HRTF model, while VBAP provides less accurate localization cues but is less sensitive to tracker error and does not require HRTF knowledge at all. CC sensitivity to tracker error is wavelength dependent—as wavelength decreases, the tracker error becomes a larger fraction of a wavelength. Moreover, the highly-individualized aspects of listener HRTFs are concentrated in the high-frequency, spectral cues that depend upon the shape of an individual listener' outer ear (or pinna). Finally, sound localization (especially left/right localization) is dominated by low-frequency interaural cues.

These properties suggest a hybrid CC/VBAP approach that uses CC is the low-frequency region and VBAP in the high-frequency region. That way, the more accurate CC localization cues are maintained in the frequency region where they are most important and where the CC sensitivity to tracker error and HRTF individualization are lowest and the less accurate and less-sensitive-to-tracker-error VBAP localization cues are used elsewhere. Typical cutoffs between the low- and high-frequency regions are in the range of 1000-2000 Hz (which reflect the fact that interaural time differences begin to spatially alias in this region).

Figure 7:
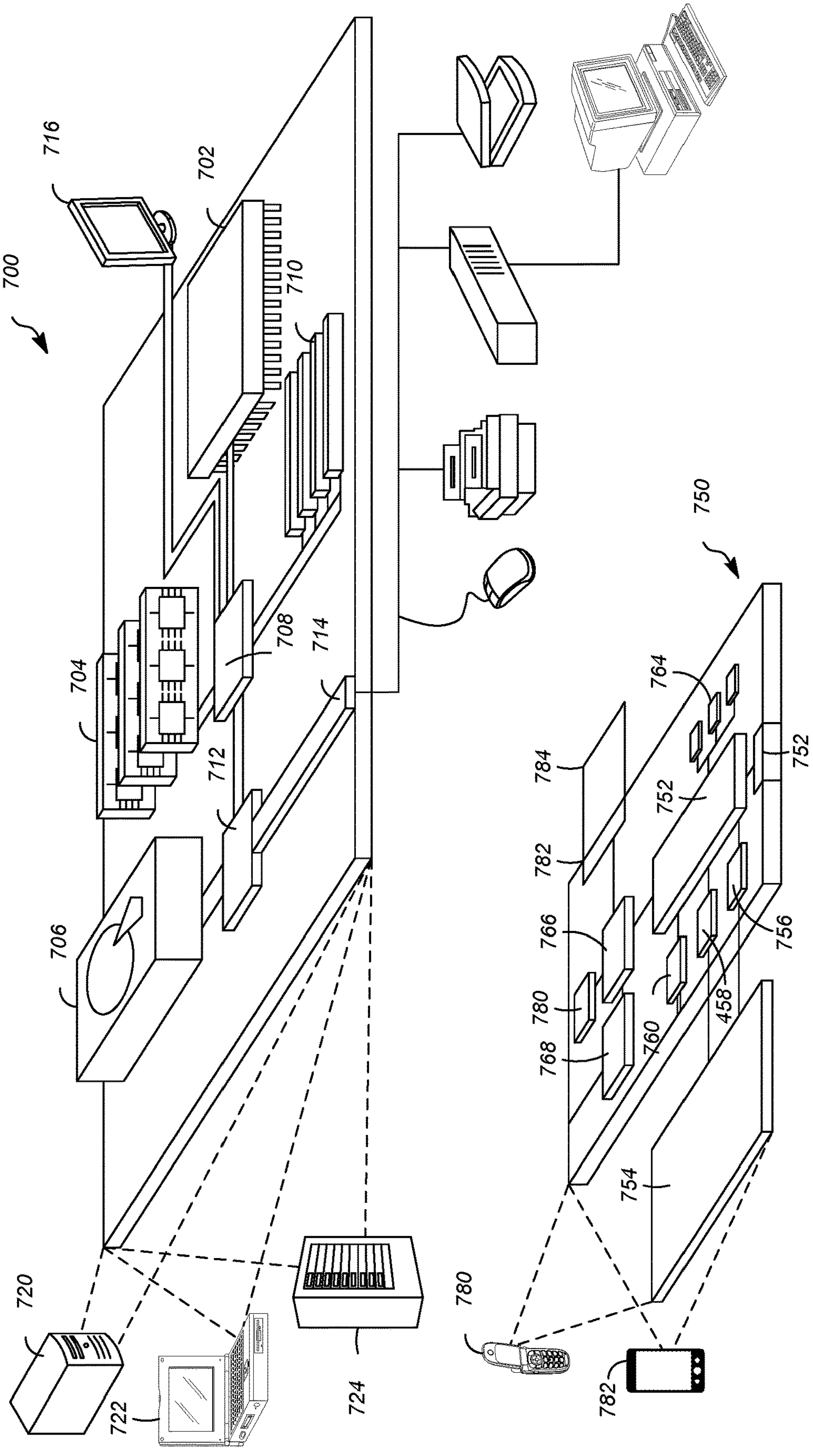
FIG. 7 illustrates an example of a computer device and a mobile computer device that can be used with circuits described here.

FIG. 7 illustrates an example of a generic computer device 700 and a generic mobile computer device 750, which may be used with the techniques described here.

As shown in FIG. 7, computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer program product comprising a nontransitory storage medium, the computer program product including code that, when executed by processing circuitry configured to perform audio source spatialization, causes the processing circuitry to perform a method, the method comprising:

receiving audio data from an audio source at a source position, the audio data representing an audio waveform configured to be converted to sound at a frequency via a plurality of loudspeakers the plurality of loudspeakers having loudspeaker positions with respect to a listener position;

generating a loudspeaker matrix having elements that are components of a vector parallel to a difference between the listener position and the loudspeaker positions of the plurality of loudspeakers;

generating a source vector having elements that are components of a vector parallel to a difference between the listener position and the source position; and performing a pseudoinverse operation on the loudspeaker matrix and the source vector to produce a weight vector the weight vector having a component representing a weight for at least one of the plurality of loudspeakers.

2. The computer program product as in claim 1, wherein a distance between the listener position and a first loudspeaker of the plurality of loudspeakers is different from a distance between the listener position and a second loudspeaker of the plurality of loudspeakers.

3. The computer program product as in claim 1, wherein a number of loudspeakers of the plurality of loudspeakers is greater than three, and wherein performing the pseudoinverse operation on the loudspeaker matrix and the source vector includes generating a product of a Penrose pseudoinverse of a loudspeaker inverse and the source vector.

4. The computer program product as in claim 3, wherein performing the pseudoinverse operation on the loudspeaker matrix and the source vector further includes minimizing a sum of squares of the components of the weight vector.

5. The computer program product as in claim 3, wherein a component of the weight vector is less than zero, and wherein the method further comprises:

removing elements of the loudspeaker matrix corresponding to a loudspeaker to which the component of the weight vector that is less than zero corresponds to form a reduced loudspeaker matrix; and performing the pseudoinverse operation on the reduced loudspeaker matrix and the source vector to produce a reduced weight vector.

6. The computer program product as in claim 1, further comprising multiplying the components of the weight vector by a scale factor, the scale factor being proportional to a distance between the listener position and the plurality of loudspeakers.

7. The computer program product as in claim 1, wherein generating the loudspeaker matrix and the source vector are part of performing a vector-based amplitude panning operation on the plurality of loudspeakers, and wherein the method further comprises:

in response to the frequency of the audio waveform being below a specified threshold, performing a crosstalk cancelation operation on the plurality of loudspeakers to produce an amplitude and phase of a respective audio signal emitted by that loudspeaker to determine spatialization cues; and in response to the frequency of the audio waveform being above the specified threshold, performing the vector-based amplitude panning operation on the plurality of loudspeakers to produce a respective weight for that loudspeaker.

8. The computer program product as in claim 7, wherein performing the crosstalk cancelation operation on the plurality of loudspeakers includes tracking the listener position over time.

9. The computer program product as in claim 7, wherein a number of loudspeakers of the plurality of loudspeakers is even, and wherein performing the crosstalk cancelation operation on the plurality of loudspeakers includes applying, to a pair of loudspeakers, a head-related transfer function configured to provide a binaural sound field, the head-related transfer function being based on a parametrized, rigid-sphere model.

10. A method, comprising:

receiving audio data from an audio source at a source position, the audio data representing an audio waveform configured to be converted to sound at a frequency via a plurality of loudspeakers, the plurality of loudspeakers having loudspeaker positions with respect to a listener position;

generating a loudspeaker matrix having elements that are components of a vector parallel to a difference between the listener position and the loudspeaker positions of the plurality of loudspeakers;

generating a source vector having elements that are components of a vector parallel to a difference between the listener position and the source position; and performing a pseudoinverse operation on the loudspeaker matrix and the source vector to produce a weight vector, the weight vector having a component representing a weight for at least one of the plurality of loudspeakers.

11. The method as in claim 10, wherein a distance between the listener position and a first loudspeaker of the plurality of loudspeakers is different from a distance between the listener position and a second loudspeaker of the plurality of loudspeakers.

12. The method as in claim 10, wherein a number of loudspeakers of the plurality of loudspeakers is greater than three, and wherein performing the pseudoinverse operation on the loudspeaker matrix and the source vector includes generating a product of a Penrose pseudoinverse of a loudspeaker inverse and the source vector.

13. The method as in claim 12, wherein performing the pseudoinverse operation on the loudspeaker matrix and the source vector further includes minimizing a sum of squares of the components of the weight vector.

14. The method as in claim 12, wherein a component of the weight vector is less than zero, and wherein the method further comprises:

removing elements of the loudspeaker matrix corresponding to a loudspeaker to which the component of the weight vector that is less than zero corresponds to form a reduced loudspeaker matrix; and performing the pseudoinverse operation on the reduced loudspeaker matrix and the source vector to produce a reduced weight vector.

15. The method as in claim 10, further comprising multiplying the components of the weight vector by a scale factor, the scale factor being proportional to a distance between the listener position and the plurality of loudspeakers.

16. The method as in claim 10, wherein generating the loudspeaker matrix and the source vector are part of performing a vector-based amplitude panning operation on the plurality of loudspeakers, and wherein the method further comprises:

in response to the frequency of the audio waveform being below a specified threshold, performing a crosstalk cancelation operation on the plurality of loudspeakers to produce an amplitude and phase of a respective audio signal emitted by that loudspeaker to determine spatialization cues; and in response to the frequency of the audio waveform being above the specified threshold, performing the vector-based amplitude panning operation on the plurality of loudspeakers to produce a respective weight for that loudspeaker.

17. The method as in claim 16, wherein performing the crosstalk cancelation operation on the plurality of loudspeakers includes tracking the listener position over time.

18. The method as in claim 16, wherein a number of loudspeakers of the plurality of loudspeakers is even, and wherein performing the crosstalk cancelation operation on the plurality of loudspeakers includes applying, to a pair of loudspeakers, a head-related transfer function configured to provide a binaural sound field, the head-related transfer function being based on a parametrized, rigid-sphere model.

19. An electronic apparatus configured to perform audio source spatialization, the electronic apparatus comprising:

memory; and controlling circuitry coupled to the memory, the controlling circuitry being configured to:

receive audio data from an audio source at a source position, the audio data representing an audio waveform configured to be converted to sound at a frequency via a plurality of loudspeakers, the plurality of loudspeakers having loudspeaker positions with respect to a listener position;

in response to the frequency of the audio waveform being below a specified threshold, perform a cross-talk cancelation operation on the plurality of loudspeakers to produce an amplitude and phase of a respective audio signal emitted by that loudspeaker to determine spatialization cues; and in response to the frequency of the audio waveform being above the specified threshold, perform a vector-based amplitude panning operation on the plurality of loudspeakers to produce weights for the plurality of loudspeakers, including generating a loudspeaker matrix having elements that are components of a vector parallel to a difference between the listener position and the loudspeaker positions of the plurality of loudspeakers, generating a source vector having elements that are components of a vector parallel to a difference between the listener position and the source position, and perform a pseudoinverse operation on the loudspeaker matrix and the source vector to produce a weight vector having components, a component of the weight vector representing a weight for one of the plurality of loudspeakers, the weights for the plurality of loudspeakers representing a factor by which an audio signal emitted by a loudspeaker is multiplied to determine spatialization cues.

* * * * *